United States Patent
Glezer et al.

(10) Patent No.: US 6,644,598 B2
(45) Date of Patent: Nov. 11, 2003

(54) MODIFICATION OF FLUID FLOW ABOUT BODIES AND SURFACES THROUGH VIRTUAL AERO-SHAPING OF AIRFOILS WITH SYNTHETIC JET ACTUATORS

(75) Inventors: Ari Glezer, Atlanta, GA (US); Michael Amitay, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 10/094,194

(22) Filed: Mar. 8, 2002

(65) Prior Publication Data

US 2002/0190165 A1 Dec. 19, 2002

Related U.S. Application Data

(60) Provisional application No. 60/274,732, filed on Mar. 10, 2001.

(51) Int. Cl.[7] .............................................. B64C 21/08
(52) U.S. Cl. ........................ 244/208; 244/199; 244/200
(58) Field of Search ................................ 244/208, 199, 244/200, 205, 198, 214, 204, 201, 207

(56) References Cited

U.S. PATENT DOCUMENTS

| | | | |
|---|---|---|---|
| 1,485,715 A | 3/1924 | Robinson | 239/423 |
| 1,878,088 A | 9/1932 | Zwikker | |
| 2,498,990 A | 2/1950 | Fryklung | 259/72 |
| 2,591,083 A | 4/1952 | Maier | 51/2 |
| 2,812,636 A | 11/1957 | Kadosch | 239/265.23 |
| 3,058,014 A | 10/1962 | Camp | 310/8.7 |
| 3,361,067 A | 1/1968 | Webb | 103/1 |
| 3,985,344 A | 10/1976 | McCord | 259/1 |
| 4,131,505 A | 12/1978 | Davis, Jr. | 156/580.1 |
| 4,171,852 A | 10/1979 | Haentjens | 406/85 |

(List continued on next page.)

FOREIGN PATENT DOCUMENTS

| DE | 3320481 | 12/1984 |
|---|---|---|
| JP | 4-103494 | 11/1967 |

OTHER PUBLICATIONS

Mason, W. H. Further information for experiment #7. Oct. 1996, http://www.aoe.vt.edu/aoe3054/manual/app3/text.html, "Fixing boundary layer transition" section pages 10 and 11.*

*Primary Examiner*—Peter M Poon
*Assistant Examiner*—Timothy D. Collins
(74) *Attorney, Agent, or Firm*—Thomas, Kayden, Horstemeyer & Risley, LLP

(57) ABSTRACT

The present invention involves a system for altering the aerodynamic shape and/or fluid flow about a solid body. The preferred embodiment comprises an obstruction disposed on the solid body and extending outwardly from the solid body into the fluid flowing over the solid body and a synthetic jet actuator embedded in the solid body such that said fluid flowing over the solid body encounters the obstruction before the synthetic jet actuator. The synthetic jet actuator includes a jet housing defined by walls, the jet housing having an internal chamber with a volume of fluid and an opening in the jet housing connecting the chamber to an external environment having the fluid, and a volume changing means for periodically changing the volume within the internal chamber so that a series of fluid vortices are generated and projected in the external environment out from the opening of the jet housing. A synthetic jet stream is formed by the fluid vortices entraining the fluid of the external environment and is projected outwardly from the solid body. The fluid flowing over the solid body contacts the synthetic jet stream forming a recirculation region, thereby modifying both the flow field and the pressure distribution and similarly modifying both the lift and drag characteristics of the solid body.

36 Claims, 12 Drawing Sheets

U.S. PATENT DOCUMENTS

| | | | |
|---|---|---|---|
| 4,206,831 A | 6/1980 | Welch et al. | 181/159 |
| 4,363,991 A | 12/1982 | Edelman | 310/316 |
| 4,369,857 A | 1/1983 | Frazer et al. | 181/159 |
| 4,516,747 A | 5/1985 | Lurz | 244/204 |
| 4,533,255 A | 8/1985 | Gronholz et al. | 366/108 |
| 4,548,240 A | 10/1985 | Graham | 138/30 |
| 4,563,684 A * | 1/1986 | Maris | 340/966 |
| 4,611,553 A | 9/1986 | Iwata et al. | 118/50 |
| 5,758,823 A * | 6/1998 | Glezer et al. | 239/4 |
| 5,957,413 A * | 9/1999 | Glezer et al. | 244/208 |

* cited by examiner

MODIFICATION OF FLUID FLOW ABOUT BODIES AND SURFACES THROUGH VIRTUAL AERO-SHAPING OF AIRFOILS WITH SYNTHETIC JET ACTUATORS

RELATED APPLICATIONS

This application is based upon, and claims priority to copending U.S. Provisional Application entitled "Virtual Aero-shaping of Airfoils at Low Angles of Attack," having Serial No. 60/274,732, filed on Mar. 10, 2001, which is incorporated herein by reference in its entirety.

FIELD OF THE INVENTION

The present invention generally relates to the control of fluid flow about solid surfaces and, more particularly, to a synthetic fluid actuator embedded in a solid surface downstream from an obstruction on the solid surface such as to emit a synthetic jet stream out of the surface and modify the characteristics of fluid flowing over and about the surface.

BACKGROUND OF THE INVENTION

The ability to manipulate and control the evolution of shear flows has tremendous potential for influencing system performance in diverse technological applications, including: lift and drag of aerodynamic surfaces, flow reattachment to wings, and aircraft stall management. That these flows are dominated by the dynamics of a hierarchy of vortical structures, evolving as a result of inherent hydrodynamic instabilities (e.g., Ho & Huerre, 1984), suggests control strategies based on manipulation of these instabilities by the introduction of small disturbances at the flow boundary. A given shear flow is typically extremely receptive to disturbances within a limited frequency band and, as a result, these disturbances are rapidly amplified and can lead to substantial modification of the base flow and the performance of the system in which it is employed.

There is no question, that suitable actuators having fast dynamic response and relatively low power consumption are the foundation of any scheme for the manipulation and control of shear flows. Most frequently, actuators have had mechanically moving parts which come in direct contact with the flow [e.g., vibrating ribbons (Schubauer & Skramstad *J. Aero Sci.* 14 1947), movable flaps (Oster & Wygnanski, 1982), or electromagnetic elements (Betzig *AIAA*, 1981)]. This class of direct-contact actuators also includes piezoelectric actuators, the effectiveness of which has been demonstrated in flat plate boundary layers (Wehrmann 1967, and Jacobson & Reynolds *Stan. U. TF-64* 1995), wakes (Wehrmann *Phys. Fl.* 8 1965, 1967, and Berger *Phys. Fl.* S191 1967), and jets (Wiltse & Glezer 1993). Actuation can also be effected indirectly (and, in principle, remotely) either through pressure fluctuations [e.g., acoustic excitation (Crow & Champagne *JFM* 48 1971)] or body forces [e.g., heating (Liepmann et al. 1982, Corke & Mangano *JFM* 209 1989, Nygaard and Glezer 1991), or electromagnetically (Brown and Nosenchuck, *AIAA* 1995)].

Flow control strategies that are accomplished without direct contact between the actuator and the embedding flow are extremely attractive because the actuators can be conformally and nonintrusively mounted on or below the flow boundary (and thus can be better protected than conventional mechanical actuators). However, unless these actuators can be placed near points of receptivity within the flow, their effectiveness degrades substantially with decreasing power input. This shortcoming can be overcome by using fluidic actuators where control is effected intrusively using flow injection (jets) or suction at the boundary. Although these actuators are inherently intrusive, they share most of the attributes of indirect actuators in that they can be placed within the flow boundary and require only an orifice to communicate with the external flow. Fluidic actuators that perform a variety of "analog" (e.g., proportional fluidic amplifier) and "digital" (e.g., flip-flop) throttling and control functions without moving mechanical parts by using control jets to affect a primary jet within an enclosed cavity have been studied since the late 1950's (Joyce, *HDL-SR* 1983). Some of these concepts have also been used in open flow systems. Viets (*AIAA J.* 13 1975) induced spontaneous oscillations in a free rectangular jet by exploiting the concept of a flip-flop actuator and more recently, Raman and Cornelius (*AIAA J.* 33 1995) used two such jets to impose time harmonic oscillations in a larger jet by direct impingement.

More recently, a number of workers have recognized the potential for MEMS (micro eclectro mechanical systems) actuators in flow control applications for large scale systems and have exploited these devices in a variety of configurations. One of a number of examples of work in this area is that of Ho and his co-investigators (e.g., Liu, Tsao, Tai, and Ho, 1994) who have used MEMS versions of 'flaps' to effect flow control. These investigators have opted to modify the distribution of streamwise vorticity on a delta wing and thus the aerodynamic rolling moment about the longitudinal axis of the aircraft.

Background Technology for Synthetic Jets

It was discovered at least as early as 1950 that if one uses a chamber bounded on one end by an acoustic wave generating device and bounded on the other end by a rigid wall with a small orifice, that when acoustic waves are emitted at high enough frequency and amplitude from the generator, a jet of air that emanates from the orifice outward from the chamber can be produced. See, for example, Ingard and Labate, *Acoustic Circulation Effects and the Nonlinear Impedance of Orifices,* The Journal of the Acoustical Society of America, March, 1950. The jet is comprised of a train of vortical air puffs that are formed at the orifice at the generator's frequency.

The concern of scientists at that time was primarily with the relationship between the impedance of the orifice and the eddies (vortical puffs, or vortex rings) created at the orifice. There was no suggestion to combine or operate the apparatus with another fluid stream in order to modify the flow of that stream (e.g., its direction). Furthermore, there was no suggestion that following the ejection of each vortical puff, a momentary air stream of "make up" air of equal mass is drawn back into the chamber and that, as a result, the jet is effectively synthesized from the air outside of the chamber and the net mass flux out of the chamber is zero.

Even though a crude synthetic jet was known to exist, applications to common problems associated with other fluid flows or with lack of fluid flow in bounded volumes were not even imagined, much less suggested. Evidence of this is the persistence of certain problems in various fields which have yet to be solved effectively.

Modification of Fluid Flows About Aerodynamic Surfaces

The capability to alter the aerodynamic performance of a given airframe by altering its shape (e.g., the "camber" of an airfoil) during various phases of the flight can lead to significant extension of the airframe's operating envelope. Geometric modification of lifting surfaces has so far been accomplished by using mechanical flaps and slats. However, because of the complex control system required, such devices are expensive to manufacture, install and maintain. Furthermore, flap systems not only increase the weight of the airframe, but also require considerable interior storage space that could be used for cargo, and additional ancillary hardware (e.g., hydraulic pumps, piping, etc.). In some applications, the weight penalty imposed by the flaps may more than offset their usefulness.

Much of the recent work on flow control techniques with the objective of extending the post stall flight envelope of various airfoil configurations has focused on the manipulation of flow separation at moderate and large angles of attack either at the leading edge or over flaps (e.g., Seifert et al., *Oscillatory Blowing: A Tool to Delay Boundary-Layer Separation*, AIAA, 1993). This has been typically accomplished by exploiting the instability of the separating shear layer and its receptivity to time-periodic actuation (e.g., pulsed blowing) on the time scale of the flow about the airfoil, which results in a Coanda-like unsteady reattachment. Active control techniques that have achieved varying degrees of separation control by manipulation of the unstable separated free shear layer have included external and internal acoustic excitation (e.g., Ahuja and Burrin, *Control of Flow Separation by Sound*, AIAA, 1984, and Hsiao et al., *Control of Wall-Separated Flow by Internal Acoustic Excitation*, AIAA, 1990), vibrating ribbons or flaps (e.g., Neuburger and Wygnanski, *The Use of a Vibrating Ribbon to Delay Separation on Two Dimensional Airfoils*, TR-88-0004, 1987), and steady and unsteady blowing or bleed (e.g., Williams et al., *The Mechanism of Flow Control on a Cylinder with the Unsteady Bleed Technique*, AIAA, January, 1991, and Chang et al., *Forcing Level Effects of Internal Acoustic Excitation on the Improvement of Airfoil Performance*, Journal of Aircraft, 1992). In these experiments, the time-periodic actuation was typically applied at a dimensionless (reduced) frequency, $F^+ \sim O(1)$ such that the actuation period scaled with the time of flight over the length of the reattached flow.

More recently, Smith et al. (*Modification of Lifting Body Aerodynamics using Synthetic Jet Actuators*, AIAA, January, 1998) and Amitay et al. (*Flow Reattachment Dynamics over a Thick Airfoil Controlled by Synthetic Jet Actuators*, AIAA, January, 1999 and *Modification of the Aerodynamics Characteristics of an Unconventional Airfoil Using Synthetic Jet Actuators*, AIAA Journal, June, 2001) demonstrated the suppression of separation over an unconventional airfoil at moderate Reynolds numbers (up to $10^6$) that resulted in a dramatic increase in lift and a corresponding decrease in pressure drag. Actuation was effected using synthetic (zero mass flux) jet actuators, which were deliberately operated at frequencies that were typically an order of magnitude higher than the characteristic (shedding) frequency of the airfoil [i.e., $F^+ \sim O(10)$ rather than $F^+ \sim O(1)$]. These authors argued that the interaction of high-frequency zero net mass flux jets with the cross flow leads to local modification of the apparent aerodynamic shape of the flow surface, and, as a result, to full or partial suppression of flow separation. Moreover, the recent experiments of Erk (*Separation Control on a Post-Stall Airfoil Using Acoustically Generated Perturbations*, Ph.D. Dissertation, 1997) demonstrated the suppression of separation on an FX61-184 airfoil at Reynolds numbers up to $3 \times 10^6$ using synthetic jet actuation at frequencies up to $F^+ \sim O(100)$.

The interaction between a cross flow over a 2-D circular cylinder and surface-mounted synthetic jet actuators was recently investigated in detail by Honohan et al. (*Aerodynamic Control Using Synthetic Jets*, AIAA, June, 2000). These authors showed that when the jets are operated on a time scale that is well below the characteristic time scale of the base flow, their interaction with the cross flow leads to the formation of distinct quasi-steady flow regions near the surface and displacement of the local streamlines induces an apparent or virtual change in the shape of the surface and in the local pressure gradient. The acceleration of the cross flow around the interaction domain is accompanied by substantial alterations of the streamwise pressure gradient both locally and globally. As a result the surface boundary layer downstream of the interaction domain becomes thinner allowing the flow to overcome stronger adverse pressure gradients and therefore delaying (or altogether suppressing) flow separation.

The concept of modifying the apparent aerodynamic shape of aero-surfaces in order to prescribe the streamwise pressure distribution and therefore to influence its aerodynamic performance is not new and was addressed in U.S. Pat. No. 5,758,853, to Glezer, et al., entitled "Synthetic Jet Actuators and Applications Thereof." This patent disclosed the use of synthetic jet actuators for the modification of fluid flow, generally. Additionally, U.S. Pat. No. 5,758,853 also discussed the use of synthetic jet actuators embedded into solid surfaces in order to alter the apparent aerodynamic shape of these surfaces.

Recent studies have suggested that the use of synthetic jet actuators in aerodynamic surfaces at relatively low levels of actuation [i.e., momentum coefficient ($C\mu$) of $O(10^{-3})$, where $C\mu$, is the momentum ratio between the jet and the free stream] and high enough operating frequencies is very effective at post stall angles of attack of the baseline airfoil, because the actuation leads to alteration of the streamwise pressure gradient and therefore to the suppression of separation. However, at low angles of attack in the absence of stall, the induced aerodynamic changes require higher actuation levels (or higher $C\mu$) and therefore an increase in energy usage, and possibly size of the synthetic jet actuator. While this energy cost may be acceptable for short periods of time (e.g., during maneuvering), it would be desirable to have a method and device for altering the aerodynamic characteristics with synthetic jet actuators at low actuation levels for prolonged actuation periods such as flight in cruise conditions.

SUMMARY OF THE INVENTION

Briefly described, the present invention involves the use of synthetic jet actuators positioned downstream from miniature surface-mounted passive obstructions for modification of fluid flow about various aerodynamic surfaces. Particularly, the present invention is concerned with a dramatically new approach to actually altering the apparent aerodynamic shape of various solid bodies at low angles of attack where the baseline flow is fully attached.

The devices capable of forming synthetic jets all have certain features common to the class of synthetic jets, which enable these devices to have novel applications for the modification of fluid flow about a solid body or surface. In particular, the present invention involves the modification of fluid flow about a body by altering the apparent aerodynamic shape of the body when the body is immersed in a fluid flow field. A brief description of the novel apparatus in process to which the present invention is directed follows:

For such an application, a synthetic jet actuator is preferably embedded in a solid body, or surface, downstream from a relatively small surface-mounted obstruction, with the jet orifice built into the body surface. The interaction of the fluid flow about the body with a synthetic jet stream produced by the actuator will change the overall fluid flow field around the solid body.

A unique feature of synthetic jet actuator arrays is that they can effectively modify wall-bounded shear flows by creating closed recirculating flow regimes near solid surfaces. In fact, the synthetic jet fluid actually penetrates the flow boundary layer to affect the overall flow field about the solid body. The interaction domain between a synthetic jet and the cross flow over a solid surface leads to a change in the apparent aerodynamic shape of the surface; hence they can be exploited for modification of aerodynamic performance measures such as lift or drag.

The preferred embodiment for the present invention is use of one or more synthetic jet actuators to modify the aerodynamic shape of a lifting surface in a flow field. Such a lifting surface will typically comprise a wing, the fuselage, a rotor blade, etc. In particular, a synthetic jet actuator embedded in a solid lifting surface either downstream (or upstream) from a miniature surface-mounted obstruction enables the formation and control of a permanent recirculation region near the jet orifice at both relatively low angles of attack and relatively low-level actuation. The obstruction pushes the fluid of the flow field away from a top surface of the lifting surface and generates a vortex downstream of the obstruction. The synthetic jet actuator entraps, controls and regulates this vortex in a region of recirculating flow. The recirculation region has the effect of modifying both the flow field and pressure distribution around the aerodynamic lifting surface, thereby modifying both lift and drag characteristics of the surface. The synthetic jet actuator can be embedded in the solid lifting surface upstream of the obstruction such that it is in fluid communication with a low pressure region that forms forward of the obstruction. In this position, the synthetic jet actuator can be used to form a permanent recirculation region near the jet orifice and similarly modify the flow field as previously discussed. Moreover, arrays can be placed both forward and aft of the obstruction and selectively energized as desired.

In particular, because the aerodynamic characteristics of an airfoil depend critically on its camber and thickness, these characteristics can be altered by synthetic jet actuators without the use of movable flaps. Similarly, placement of jet arrays and the creation of closed recirculating flow regions along both the upper (suction) and lower (pressure) surfaces of an airfoil can result in changes in its apparent thickness and camber. It should be noted that the obstruction can be designed to effect the desired local changes in flow direction with minimal drag penalty by either being attached to the surface or by being slightly displaced from the surface to allow for surface venting.

Other features and advantages will become apparent to one with skill in the art upon examination of the following drawings and detailed description. All such additional features and advantages are intended to be included herein within the scope of the present invention, as is defined by the claims.

BRIEF DESCRIPTION OF THE DRAWINGS

The present invention can be better understood with reference to the following drawings. The drawings are not necessarily to scale, emphasis instead being placed upon clearly illustrating principles of the present invention. Moreover, like reference numerals designate corresponding parts throughout the several views.

DETAILED DESCRIPTION OF THE PREFERRED EMBODIMENTS

It will be obvious to those skilled in the art that many modifications and variations may be made to the preferred embodiments of the present invention as described hereafter without substantially departing from the spirit and scope of the present invention. All such modifications and variations are intended to be included herein within the scope of the present invention, as is set forth in the appended claims.

The present invention involves what are commonly known as synthetic jet actuators. Synthetic jet actuators, generally, are described in detail in U.S. Pat. No. 5,758,853 to Glezer et al., entitled "Synthetic Jet Actuators and Applications Thereof," which is incorporated herein by reference. Other embodiments of synthetic jet actuators, as well as various applications of synthetic jet actuators, are discussed in U.S. Pat. No. 5,894,990 to Glezer et al., U.S. Pat. No. 6,123,145 to Glezer et al., U.S. Pat. No. 6,056,204 to Glezer et al., U.S. Pat. No. 5,988,522 to Glezer et al., U.S. Pat. No. 5,957,413 to Glezer et al., U.S. patent application Ser. No. 09/654,559, filed Sep. 1, 2000 to Glezer, et al., and U.S. patent application Ser. No. 08/969,589, filed Nov. 13, 1997 to Glezer, et al., all of which are hereby incorporated by reference as if fully set out herein.

Figure 1A:
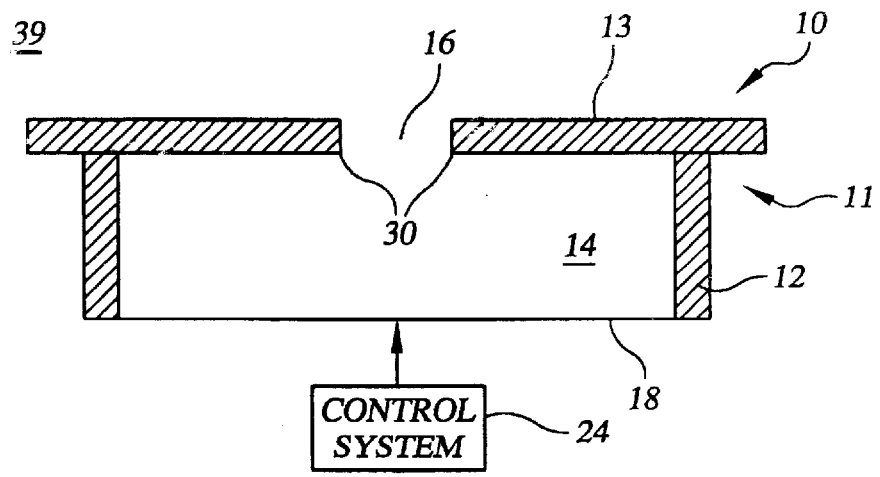
FIG. 1A is a schematic cross-sectional side view of a zero net mass flux synthetic jet actuator with a control system.

FIG. 1A depicts one embodiment of a synthetic jet actuator 10 comprising a housing 11 defining and enclosing an internal chamber 14. The housing 11 and chamber 14 can take virtually any geometric configuration, but for purposes of discussion and understanding, the housing 11 is shown in cross-section in FIG. 1A to have a rigid side wall 12, a rigid front wall 13, and a rear diaphragm 18 that is flexible to an extent to permit movement of the diaphragm 18 inwardly and outwardly relative to the chamber 14. Note that the use of a flexible diaphragm is not required for the present invention. The wall where the diaphragm is in the preferred embodiment may comprise, for example, a piston. The front wall 13 has an orifice 16 of any geometric shape. The orifice diametrically opposes the rear diaphragm 18 and connects the internal chamber 14 to an external environment having ambient fluid 39.

The flexible diaphragm 18 may be controlled to move by any suitable control system 24. For example, the diaphragm 18 may be equipped with a metal layer, and a metal electrode may be disposed adjacent to but spaced from the metal layer so that the diaphragm 18 can be moved via an electrical bias imposed between the electrode and the metal layer. Moreover, the generation of the electrical bias can be controlled by any suitable device, for example but not limited to, a computer, logic processor, or signal generator. The control system 24 can cause the diaphragm 18 to move periodically, or modulate in time-harmonic motion, and force fluid in and out of the orifice 16.

Alternatively, a piezoelectric actuator could be attached to the diaphragm 18. The control system would, in that case, cause the piezoelectric actuator to vibrate and thereby move the diaphragm 18 in time-harmonic motion. The method of causing the diaphragm 18 to modulate is not limited to piezoelectric actuation and other appropriate methods will be obvious to one with ordinary skill in the art. Also, the various U.S. Patents discussed and incorporated above also disclose other methods of vibrating a membrane of a synthetic jet actuator.

Figure 1B:
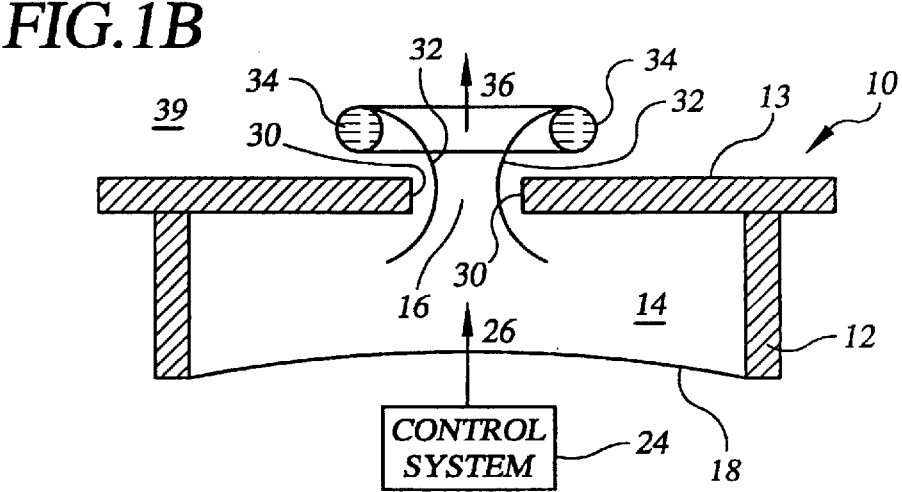
FIG. 1B is a schematic cross-sectional side view of the synthetic jet actuator of FIG. 1A depicting the jet as the control system causes the diaphragm to travel inward, toward the orifice.

The operation of the typical synthetic jet actuator 10 will now be described with reference to FIGS. 1B and 1C. FIG. 1B depicts the synthetic jet actuator 10 as the diaphragm 18 is controlled to move inward into the chamber 14, as depicted by arrow 26. The chamber 14 has its volume decreased and fluid is ejected through the orifice 16. As the fluid exits the chamber 14 through the orifice 16, the flow separates at sharp orifice edges 30 and creates vortex sheets 32 which roll into vortices 34 and begin to move away from the orifice edges 30 in the direction indicated by arrow 36.

Figure 1C:
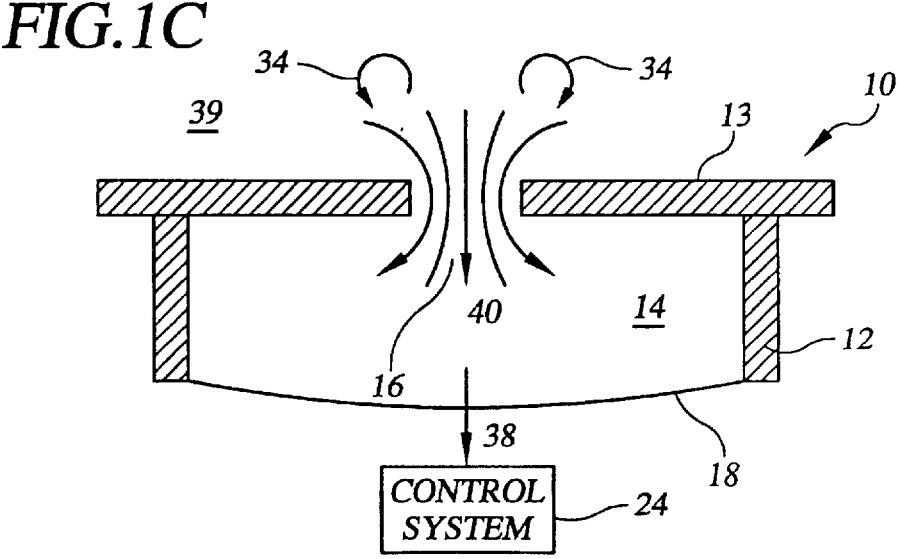
FIG. 1C is a schematic cross-sectional side view of the synthetic jet actuator of FIG. 1A depicting the jet as the control system causes the diaphragm to travel outward, away from the orifice.

FIG. 1C depicts the synthetic jet actuator 10 as the diaphragm 18 is controlled to move outward with respect to the chamber 14, as depicted by arrow 38. The chamber 14 has its volume increased and ambient fluid 39 rushes into the chamber 14 as depicted by the set of arrows 40. The diaphragm 18 is controlled by the control system 24 so that when the diaphragm 18 moves away from the chamber 14, the vortices 34 are already removed from the orifice edges 30 and thus are not affected by the ambient fluid 39 being drawn into the chamber 14. Meanwhile, a jet of ambient fluid 39 is synthesized by the vortices 34 creating strong entrainment of ambient fluid drawn from large distances away from the orifice 16.

There are many other possible embodiments of a synthetic jet actuator. For example, the diaphragm may be replaced by a piston. Alternatively, another method for drawing fluid into and then ejecting fluid from the synthetic jet actuator chamber may be employed, such as, for example, the use of combustion. Various methods of constructing synthetic jet actuators are now well known by one with ordinary skill in the art, and all are meant to be within the scope of the present invention.

A synthetic jet actuator may be embedded in various solid bodies in fluid flow fields in order to effectively alter the apparent aerodynamic shape of that solid body. Synthetic jet actuators can be employed to modify either external flows or internal flows. Some potential applications were disclosed in U.S. Patents mentioned and incorporated by reference above.

Several studies have been performed with a synthetic jet actuator embedded in the surface of an object, such as an aerodynamic surface, in a free stream fluid flow. The data from these studies suggests that relatively low-level actuation [i.e., $C\mu$ of $O(10^{-3})$] is most effective at post stall angles of attack of the aerodynamic surface, but that the induced aerodynamic changes at low angles of attack are, in effect, marginal. Control effectiveness can be realized at low angles of attack with increased actuation levels (or higher $C\mu$). However, this approach sacrifices efficiency. Increasing the actuation level of a synthetic jet actuator clearly requires the expenditure of more energy. Thus, the present invention offers a new approach to the modification of the aerodynamic performance of airfoils at low angles of attack such that synthetic jet actuators of low actuation levels may be used.

The preferred embodiment of the present invention, though applications of this concept are not limited to this embodiment, involves the use of a synthetic jet actuator 10 embedded in a surface of an object downstream from a miniature obstruction also on the surface of the object. The interaction of the synthetic jet actuator with a free stream fluid flow across the surface of the object results in the modification of lift and drag characteristics of the object. Although the preferred embodiment described below uses a synthetic jet actuator 10 of the type described in FIGS. 1A–1C, other embodiments of synthetic jet actuators may also be employed.

Figure 2A:
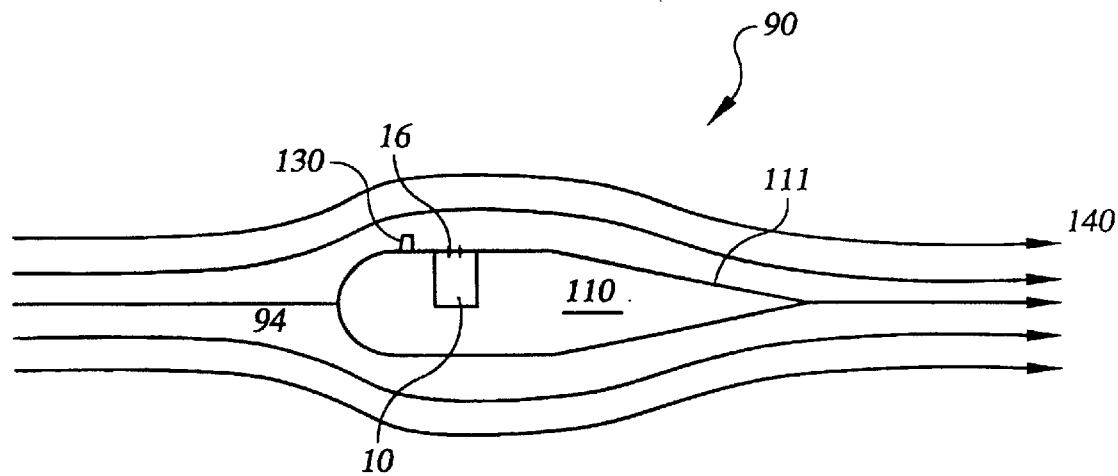
FIG. 2A is a schematic cross-sectional side view of a wing with the synthetic jet actuator of FIG. 1A embedded in the wing.

FIG. 2A depicts the preferred embodiment 90 of a synthetic jet actuator 10 used to modify the lift and drag characteristics of an aerodynamic surface. In this embodiment 90, a synthetic jet actuator 10 is embedded in an airfoil 110 such that the synthetic jet orifice 16 is flush with the external surface, or skin 111, of the airfoil 110. Of course, multiple synthetic jet actuators could be positioned in the wing surface. As will be described below, the presence of multiple synthetic jet actuators will permit more accurate tailoring of the enhancement of the lift and drag characteristics for each particular flight regime of an aircraft.

As also depicted in FIG. 2A, the synthetic jet actuator 10 is positioned downstream from a miniature surface-mounted obstruction 130. The positioning of the orifice 16 along the airfoil skin 111 can be determined based on the particular effect on the flow desired. Of course, if multiple synthetic jet actuators are employed, the placement of each actuator orifice 16 may also be positioned such as to yield a specific maximum effect at a specific aircraft flight regime.

Figure 12:
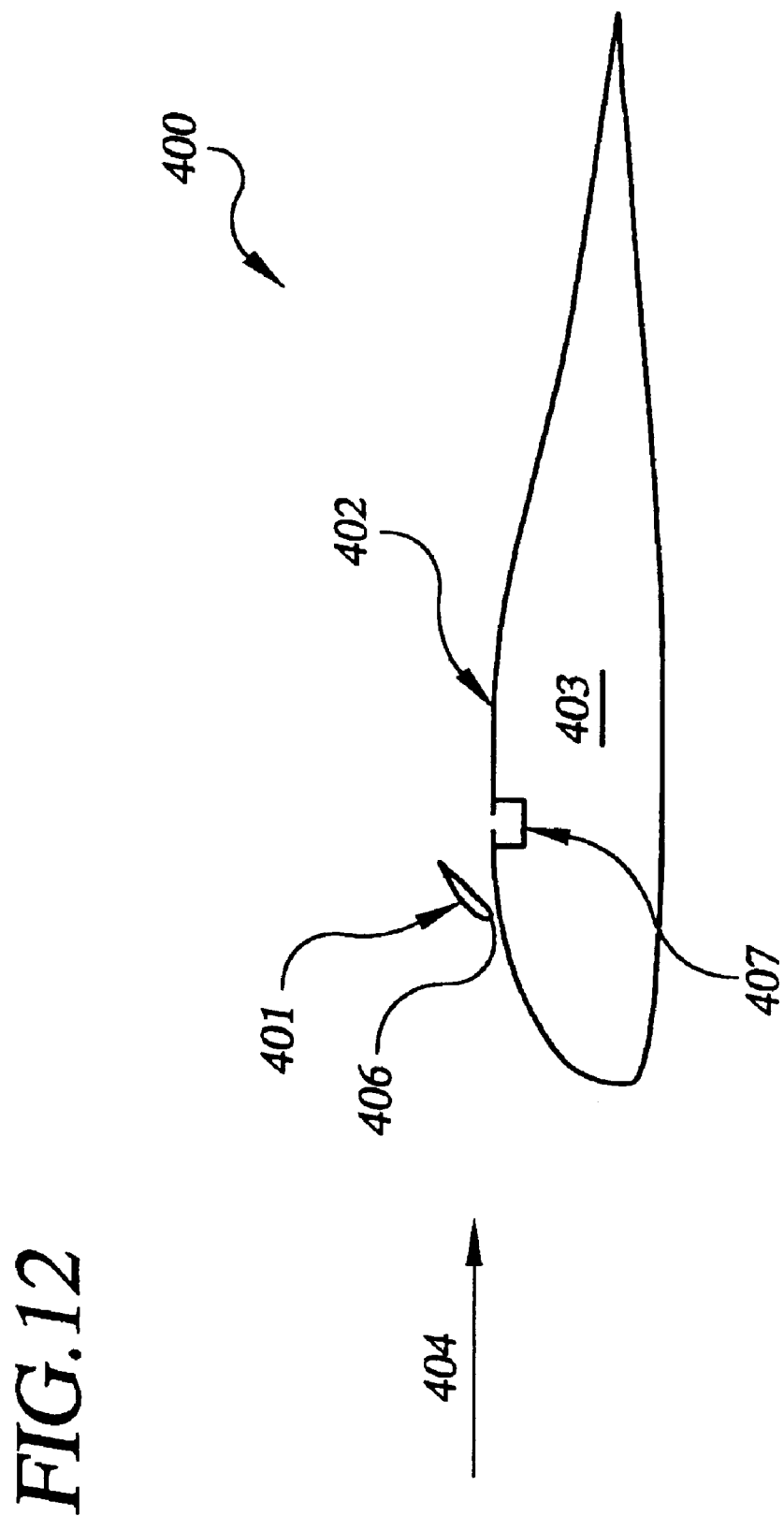
FIG. 12 is a schematic cross-sectional side view of a wing with a synthetic jet actuator of FIG. 1A embedded in the wing downstream from an obstruction mounted slightly above the wing surface.

Additionally, the obstruction 130 need not be of fixed size or position. For example, the obstruction could be an inflatable member so that the size of the obstruction could be adjusted. The obstruction could also, for example, consist of a hinged flap on the surface of an airfoil, wherein the angle of opening of the flap is controlled by an inflatable member such that the obstruction could cover the jet orifice while it is not in use. Again, the level of obstruction could be changed dynamically in order to specifically tailor the alteration of the fluid flow. As well, the obstruction could be constructed so that it would be partially vented or allow bleed of the cross flow from underneath to reduce the drag penalty, as discussed infra with regard to FIG. 12. The obstruction could further house the jet actuator.

In the preferred embodiment, the airfoil 110 is placed in a freestream of fluid, as depicted by the arrows 94. The flow of the fluid 94 about the airfoil 110 is depicted by the set of streamlines 140. The obstruction 130 has the function of pushing the flow upward, away from the surface of the airfoil 110. Also, a vortex is generated at the upper edge of the obstruction 130 and this vortex rolls up into the area along the airfoil surface 111 directly behind the obstruction 130. As depicted, the airfoil 110 is at zero degree angle of attack, and the airfoil 110 is symmetric about its chord line. While the embodiment depicted in FIG. 2A is at zero degrees angle of attack, the present invention also functions appropriately at other angles of attack and when the obstruction and the jet are placed on the pressure side of the airfoil.

Figure 2B:
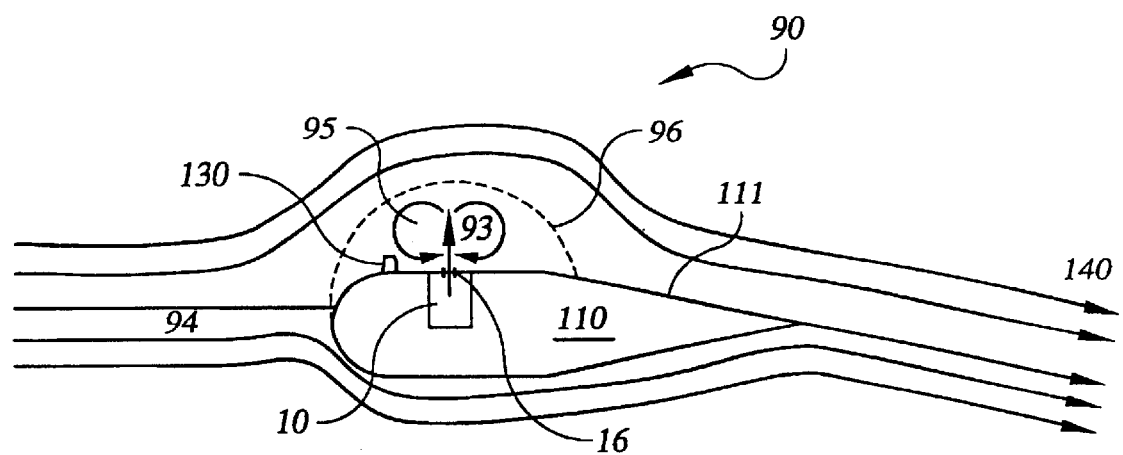
FIG. 2B is a schematic cross-sectional side view of the wing of FIG. 2A in operation showing the modification of fluid flow resulting from the synthetic jet actuator of FIG. 1A.

FIG. 2B shows the first preferred embodiment 90 when the synthetic jet actuator 10 is operational. When the synthetic jet actuator 10 is operational, the synthetic jet actuator 10 forms a fluid flow, as depicted by arrow 93, normal to the synthetic jet orifice 16 in the airfoil skin 111. Because the synthetic jet actuator 10 does not inject any new fluid into the freestream flow 140, a closed recirculating flow domain 95 is formed adjacent to the airfoil skin 111. This domain 95 is depicted in FIG. 2B as bounded by the broken line 96. This recirculating region traps the vortex generated by the obstruction 130. Additionally, because this recirculating region 95 is closed, the aerodynamic shape of the airfoil surface 111 is effectively modified. The new effective shape is depicted by the airfoil skin 111 with the addition of the broken line 96, representing the closed domain of flow 95. Because of the airfoil surface modification, the streamlines 140 of the freestream flow 94 will flow over the recirculating region 95, defined by the broken line 96, just as if the broken line 96 were a solid part of the airfoil skin 111. Thus, the aerodynamic characteristics of the airfoil 110 are changed by operation of the synthetic jet actuator 10.

Basically, the preferred embodiment depicted in FIGS. 2A and 2B demonstrates a flow control technique that, when operational, reduces the pressure drag of the airfoil at low angles of attack with minimal or no penalty in lift. The approach is to modify the pressure distribution on the surface 111 of the airfoil 110 by exploiting virtual aeroshaping of the surface that is achieved by the formation of a stationary recirculating flow domain 96 next to the surface 111. The formation of this domain alters the flow above the airfoil by inducing a displacement of the local streamlines 140 that is sufficient to modify the pressure distribution on the surface 111 of the airfoil 110 even at small angles of attack ($\alpha$). In the preferred embodiment, this domain is formed by combining the activation of a high-frequency synthetic jet actuator 10 that is placed downstream from a miniature surface-mounted passive obstruction 130. Of course, as mentioned above, the obstruction need not be passive. For example, the obstruction could comprise an inflatable rib. A control system could monitor the various flight conditions of the aircraft and adjust the size of the obstruction depending on the particular flight condition.

Also, because of the use of the obstruction 130, the synthetic jet actuator 10 is effective at low angles of attack even if the synthetic jet actuator has relatively low strength. This advantage is due to the fact that the obstruction 130 first pushes the fluid flow away from the surface 111 of the airfoil 110 and generates a vortex. Then, the synthetic jet actuator 10 functions downstream of this obstruction 130 and entraps the vortex generated by the obstruction.

Figure 3:
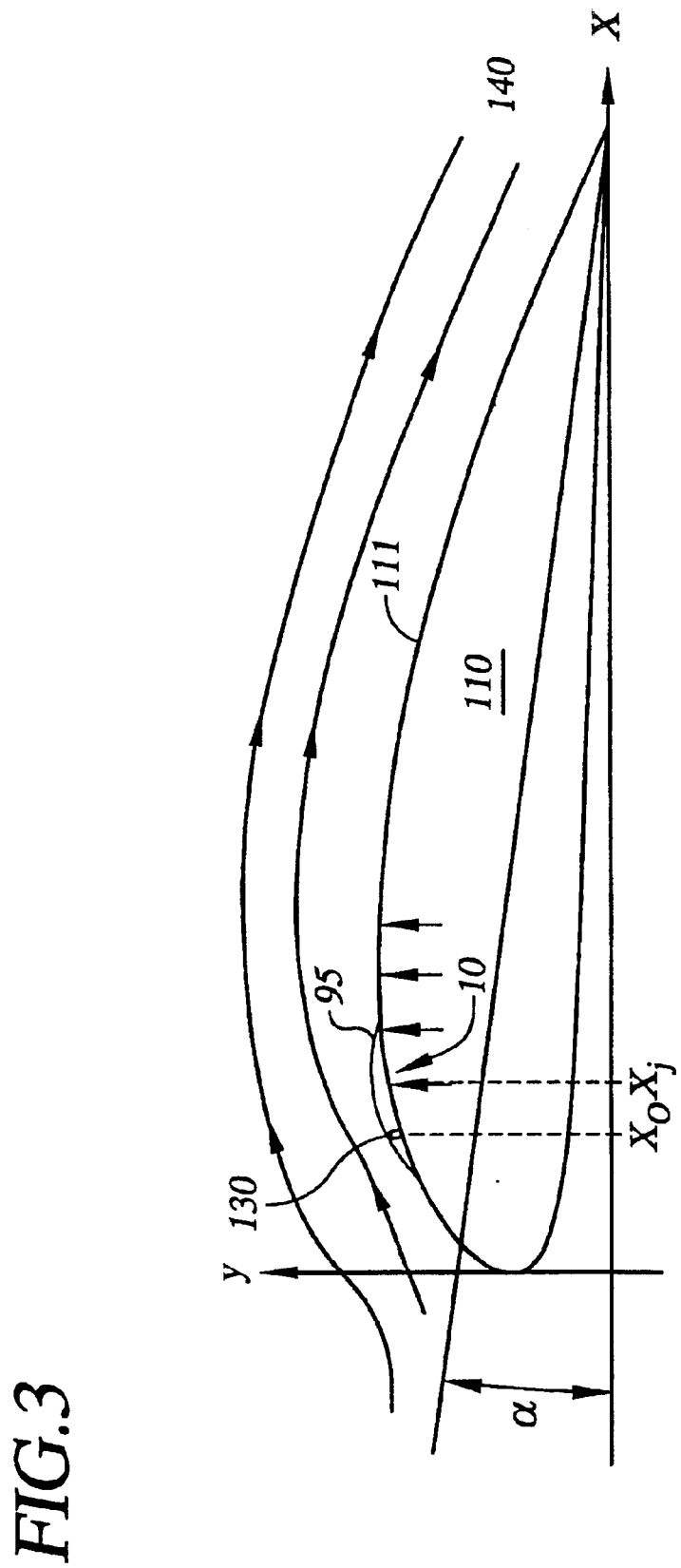
FIG. 3 is a schematic cross-sectional side view of a wing with a synthetic jet actuator of FIG. 1A embedded in the wing downstream from a surface mounted passive obstruction.

A more specific example of the first preferred embodiment is presented in FIG. 3. The more specific embodiment has been tested by the inventors and some of these test results are presented herein generally in order to demonstrate the effectiveness of the present invention. However, the test results are not intended to be limiting and are presented only as examples of results that may be achieved with a very specific embodiment of the presently-disclosed apparatus and method. Other apparatus and method also included within the scope of the present invention could be used and may result in different results.

As shown in FIG. 3, an airfoil 110 of the first preferred embodiment includes a synthetic jet actuator 10 and miniature passive obstruction 130, the dimensions and locations of which are selected for ease of description. In the preferred embodiment, the characteristic height (h) of the obstruction 130 (above the surface 111 of the airfoil 110) is $h=(9.3\times10^{-3})(c)$ (i.e., less than 1% of the chord) and it is placed at $x_o/c=0.19$. The synthetic jet actuator 10 is located at $X_{j/c}=0.22$ (i.e., downstream of the obstruction 130) and is operated at $C\mu=1.9\times10^{-3}$. As noted above, other dimensions and locations of the various elements of the present invention are envisioned for differing embodiments.

For example, the obstruction could comprise an inflatable rib along the span of the airfoil. In this way, the size and/or shape of the obstruction could be modified by simply increasing or decreasing the amount of fluid in the inflatable rib. Other devices for altering the size and shape of the obstruction are possible and are intended to be included within the scope of the present invention. Additionally, the obstruction could be moveable along the surface 111 of the airfoil 110.

Although the obstruction 130 is preferably positioned along the first one half chord of the airfoil 110, the obstruction 130, and the synthetic jet actuator 10 could be positioned rearward of the center chord point of the airfoil. In fact, the obstruction 130 and the synthetic jet actuator 10 of the present invention could even be positioned along an under surface of the airfoil 110. This would result in dramatically differing pressure, lift, and drag modifications. However, in certain situations, which will be understood by one having ordinary skill in the art, it may be desirable to position the obstruction 130 and the synthetic jet actuator 10 on the lower surface of an airfoil 110.

Additionally, other embodiments having different positions of the synthetic jet actuator 10 along the surface 111 of the airfoil 110 may be desired. This will be discussed in more detail below. However, briefly, it may be desirable to provide an array of synthetic jet actuators along the surface of the airfoil. This is represented generally in FIG. 3 by the multiple arrows in the interior of the airfoil 110. For a given flight condition, a certain synthetic jet actuator may be used. When the flight condition changes, a different synthetic jet actuator may be operated.

With either an obstruction whose size can be modified or an array of synthetic jet actuators, it may be preferred to implement a computerized control system to modify the obstruction size or synthetic jet location based on flight conditions. One with ordinary skill in the art can design such a simple control system and algorithm through routine experimentation. Similarly, though routine experimentation, the best obstruction size and best synthetic jet actuator location for a given airfoil, at a given flight condition, may be determined.

Figure 4:
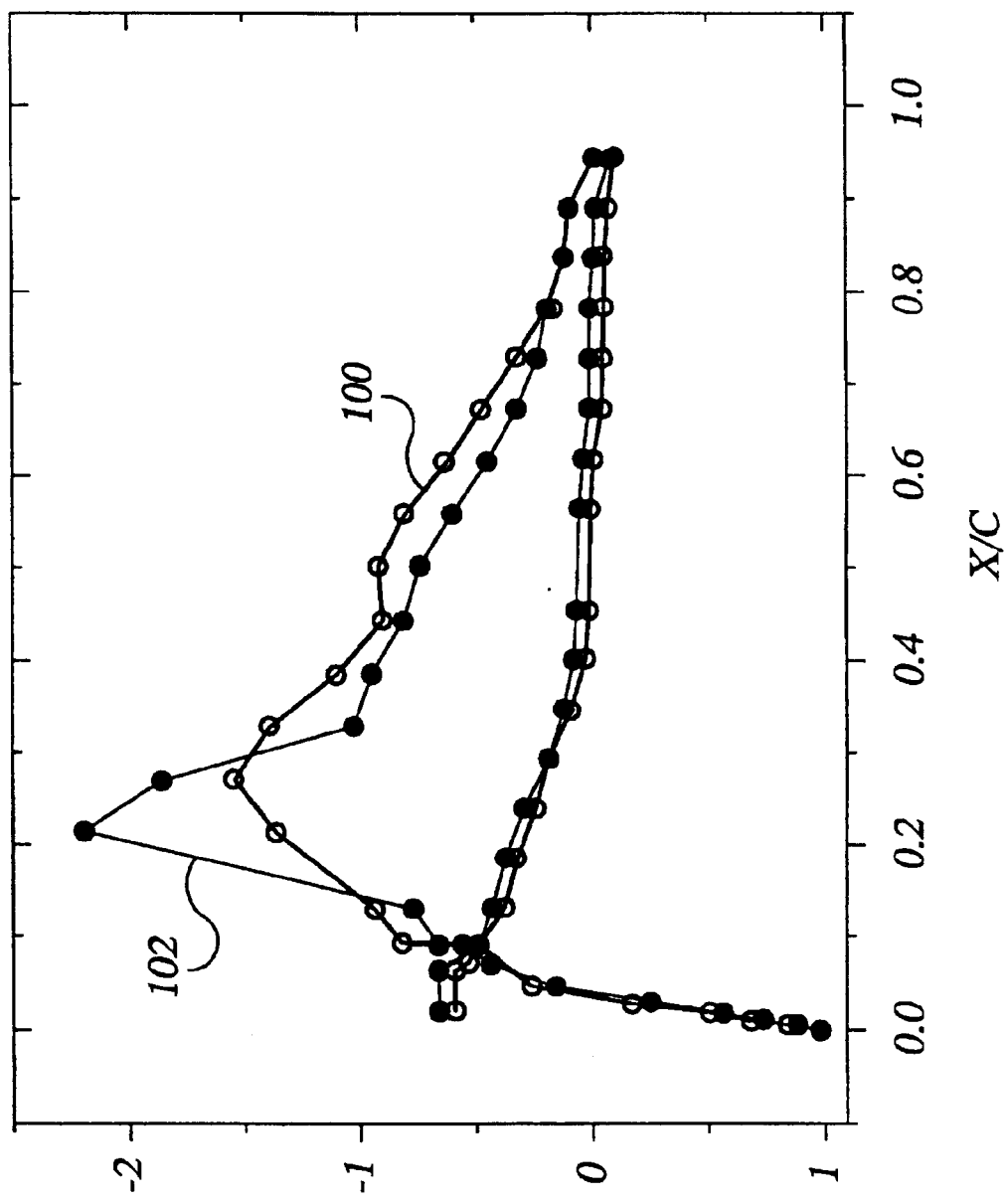
FIG. 4 is a plot of the pressure coefficient distribution of the airfoil shown in FIG. 3, for both actuation and baseline configurations.

Considering the first preferred embodiment of FIG. 3 for a typical airfoil, such as a Clark-Y airfoil, the following discussion depicts approximate test results to demonstrate the advantages of the preferred embodiment of the present invention. For an angle of attack of 1° and $Re_c$=381,000, the distribution of the pressure coefficient, $C_p$, around the circumference of the airfoil 110 for the baseline configuration of the preferred embodiment 100 and in the presence of actuation 102 are shown in FIG. 4. At this angle of attack the baseline flow is attached to the surface 111 of the airfoil 110. The line 102 representing the pressure distribution of the airfoil 110 during actuation of the synthetic jet actuator shows an increase (approximately 42%) in the magnitude of the suction peak and its displacement in the upstream direction (to x/c≈0.21). The pressure recovery is such that magnitude of the static pressure for x/c>0.33 is smaller than for the baseline configuration 100 (i.e., within this domain, the pressure difference between the suction and pressure sides is smaller when the control is applied) indicating that there is likely a net reduction in pressure drag. Note that upstream (x/c<0.19) of the obstruction 130 the pressure is slightly lower than for the baseline configuration 100 (i.e., less negative) due to blockage caused by the obstruction 130.

Figure 5A:
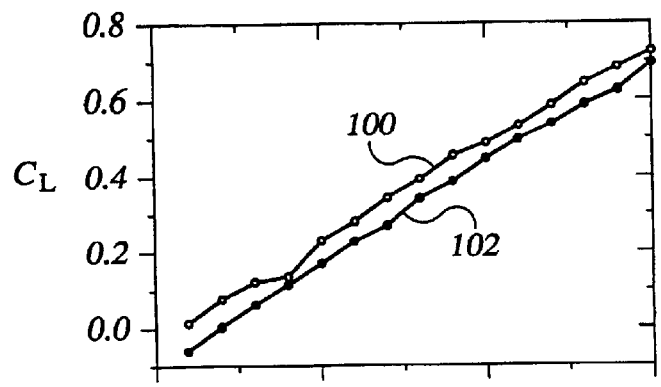
FIG. 5A is a plot of the lift coefficient for the airfoil shown in FIG. 3, over the range of angles of attack from −9° to 5°.
Figure 5B:
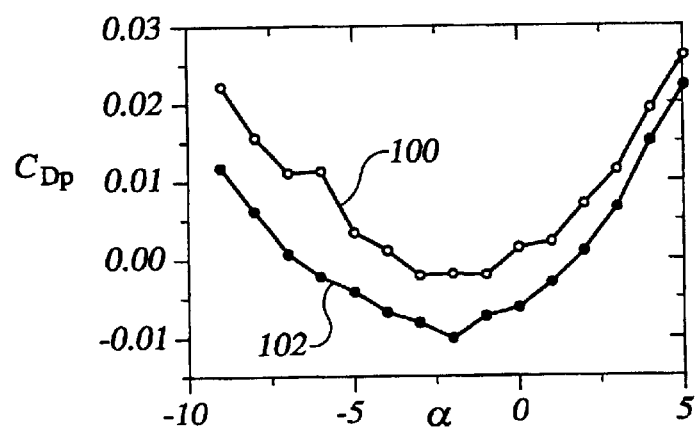
FIG. 5B is a plot of the pressure drag coefficient for the airfoil shown in FIG. 3, over the range of angles of attack from −9° to 5°.
Figure 5C:
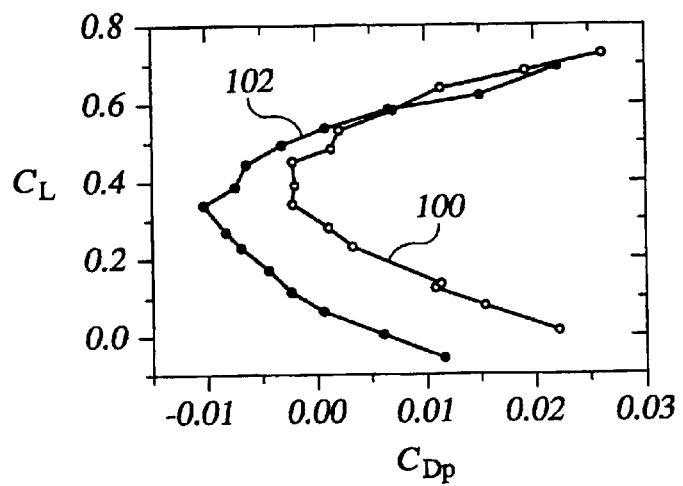
FIG. 5C is a plot of the drag polar for the airfoil shown in FIG. 3, over the range of angles of attack from −9° to 5°.

These effects are evident from distributions of the lift coefficient ($C_L$), pressure drag coefficient ($C_{Dp}$), and the pressure drag polar (FIGS. 5A–5C, respectively) that can be computed from a series of pressure measurements over a range of angles of attack (−9°<α<5°). For this range of angles of attack, activation 102 of the synthetic jet actuator results in reductions in both the (pressure) drag ($C_{Dp}$) and the lift coefficients ($C_L$). Note that the reduction in lift is almost uniform throughout the range of measurements. However, while the reduction in the lift is approximately 10% with respect to the baseline configuration 100 (FIG. 5A), the corresponding reduction in the pressure drag is greater than 30% (FIG. 5B), resulting in an increase of the lift-to-pressure drag ratio for a given angle of attack. Moreover, the pressure drag polar (FIG. 5C) shows that for $C_L$<0.25, the pressure drag of the modified airfoil, line 102, decreases significantly. The reduction in pressure drag ($C_{Dp}$) without a substantial loss in lift ($C_L$) may be important in cruise conditions and lead to significant savings in fuel over long distances.

Figure 6A:
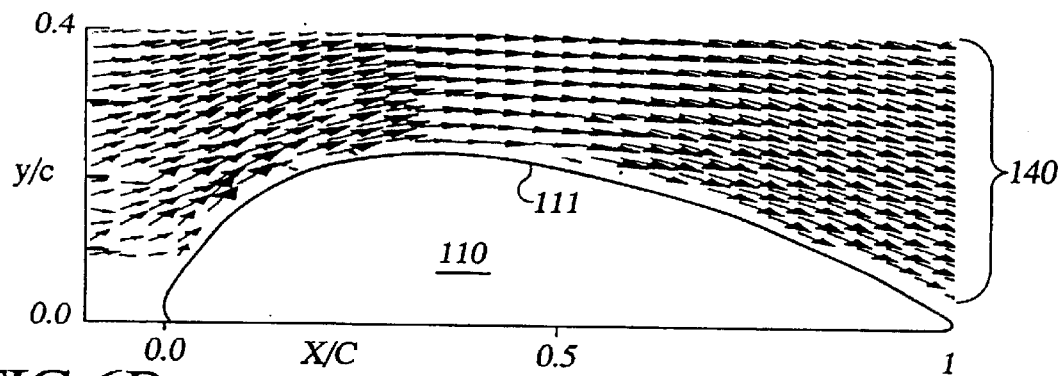
FIGS. 6A and 6C are cross-stream maps of the time-averaged velocity vector field for the baseline configuration.
Figure 6B:
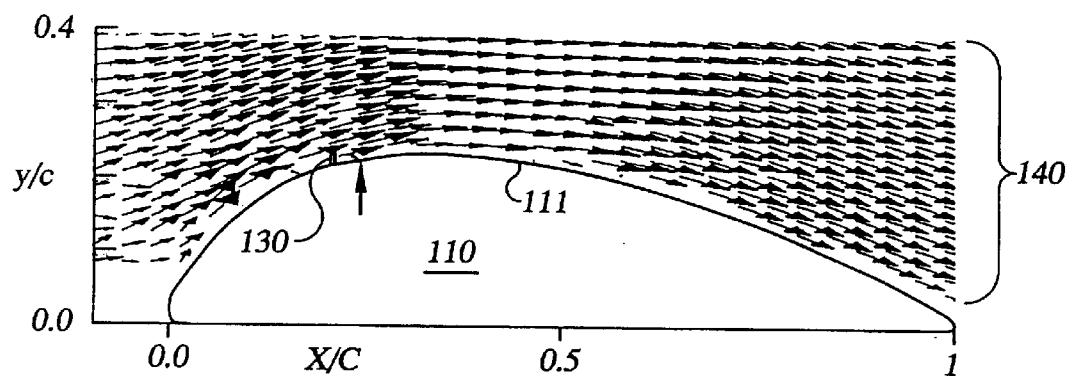
FIGS. 6B and 6D are cross-stream maps of the time-averaged velocity vector field for the airfoil in FIG. 3.
Figure 6C:
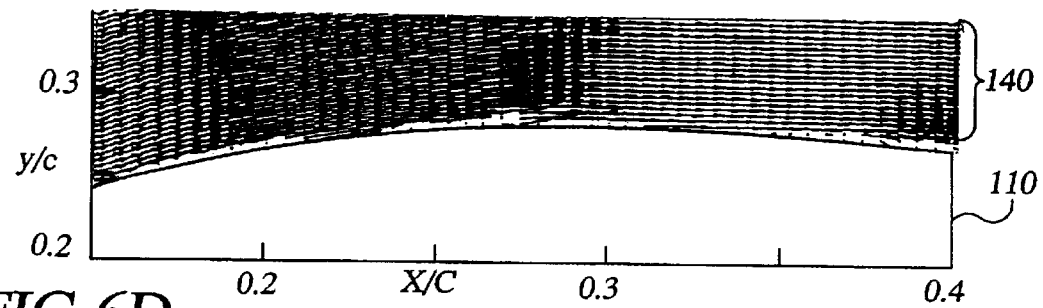
Figure 6D:
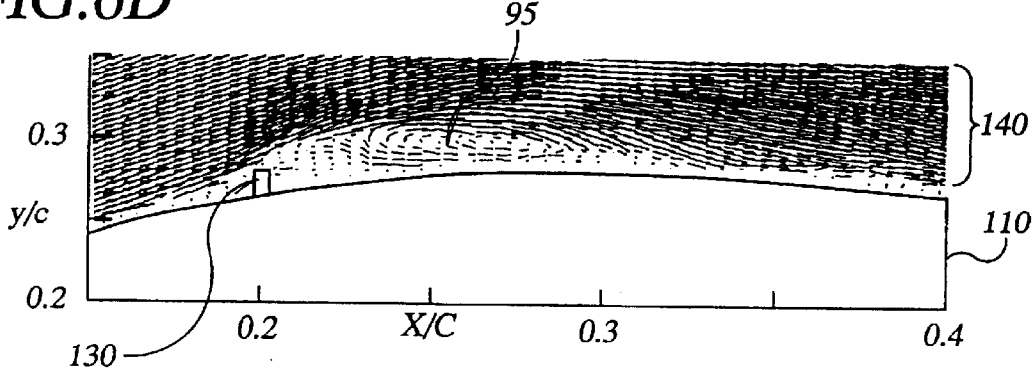

FIGS. 6A–6D depict the typical effect of the actuation of the preferred embodiment on the flow field above the surface 111 of the airfoil 110 using particle image velocimetry (PIV) in the x-y plane (z=0). FIGS. 6A–6D show cross-stream maps of the time-averaged velocity vector field 140 of the baseline configuration (FIGS. 6A and 6C) and of the controlled flow during actuation (FIGS. 6B and 6D). Magnified views of the domain of interaction between the control actuation and the flow field are shown in FIGS. 6C and 6D.

In the absence of control, the time-averaged velocity vector field 140 is clearly attached to the surface 111 of the airfoil 110 (FIGS. 6A and 6C). When actuation is applied (FIG. 6B), the velocity vector field 140 above the surface 111 of the airfoil 110 appears to be qualitatively similar to the corresponding velocity vector field 140 in the absence of the control (FIG. 6A). The high-magnification images (FIGS. 6C and 6D) of the velocity vector field 140 in the vicinity of the synthetic jet actuator 10 show the formation of a closed recirculation region 95 downstream of the obstruction 130. Despite its relatively small characteristic scales (cross-stream and streamwise dimensions of approximately 0.03 c and 0.1 c, respectively), the presence of this recirculation region 95 is sufficient to create the aerodynamic modifications depicted in FIGS. 5A–5C.

The internal structure of the recirculation region 95 can be further demonstrated if the preferred embodiment is examined using phase-averaged velocity vector maps. The vector maps in FIGS. 7A–7F represent maps acquired at six time increments during the synthetic jet actuation cycle. Recall that a synthetic jet actuator has both blowing and suction cycles. During the suction cycle, the volume of the typical synthetic jet actuator cavity expands and fluid is drawn into the synthetic jet actuator. Then, in the blowing cycle, the fluid is ejected from the synthetic jet actuator.

Figure 7A:
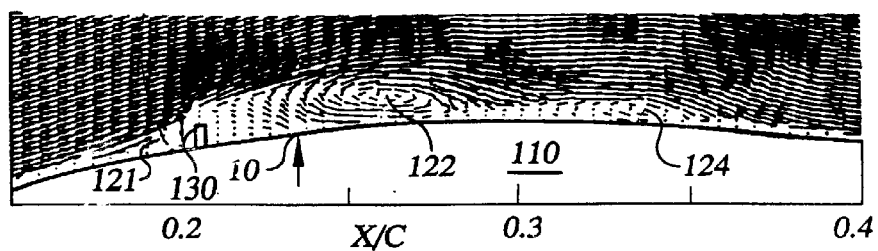
FIGS. 7A–7F are phase averaged velocity vector maps for the airfoil shown in FIG. 3, acquired at six time increments during the synthetic jet actuator cycle.
Figure 7B:
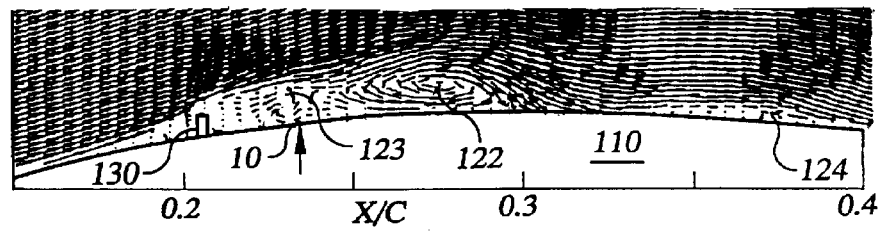
Figure 7C:
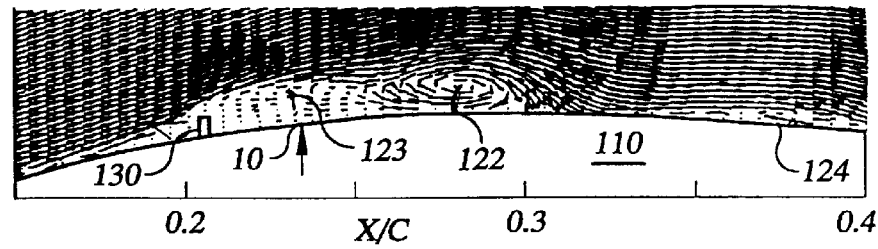
Figure 7D:
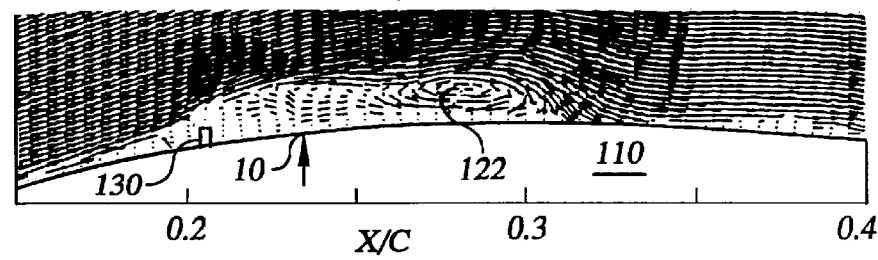

FIGS. 7A and 7D correspond to the beginning of the blowing and suction cycles, respectively. At the beginning of the blowing cycle (FIG. 7A), the recirculation region of the preferred embodiment includes a clockwise vortex 122 centered approximately at x'=6.1 (h) downstream from the obstruction 130 (x' being the distance from the base of the obstruction 130). The image also shows the blockage 121 upstream of the obstruction 130 and the separated flow downstream from its cross-stream edge. Also in FIG. 7A, a smaller clockwise vortex 124 is visible farther [x'=12.2 (h)] downstream.

As the blowing proceeds (FIGS. 7B and 7C), the upstream (larger) clockwise vortex 122 seems to intensify as is evidenced by the relatively strong downwash that is induced near the downstream edge of the recirculation region and is advected farther downstream. Note that a weak counter-clockwise vortex 123 is formed on the left side of the synthetic jet orifice 10. Recall that the nominally 2 dimensional synthetic jet actuator forms a counter rotating vortex pair during its blowing cycle. At the same time the strength of the secondary, smaller clockwise vortex 124 is reduced.

Figure 7E:
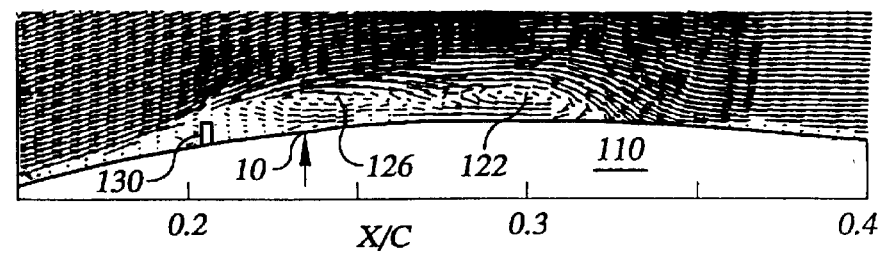
Figure 7F:
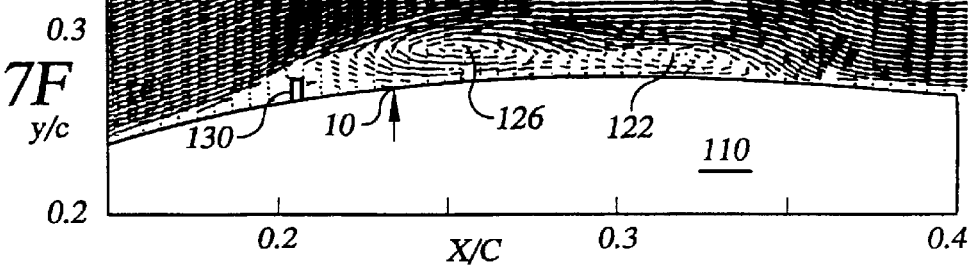

The effect of the suction stroke (FIG. 7D) is to ingest the weak counterclockwise vortex 123 (FIGS. 7B and 7C) immediately downstream of the obstruction 130 and to induce the formation of a second clockwise vortex 126 within the recirculation region (FIG. 7E). This second clockwise vortex 126 intensifies as the downstream (earlier) clockwise vortex 122 becomes weaker. By the time the cycle repeats itself, the latter clockwise vortex 122 is advected outside of the downstream edge of the recirculation region. This sequence of images clearly indicates that the streamwise extent of the recirculation region is of the order of one to two wavelengths of the actuation frequency (e.g., based on half the local free stream velocity). More importantly, downstream from the recirculation region, the actuation frequency has negligible temporal effect on the vorticity distribution within the wall boundary layer.

The characteristic streamwise scale of the recirculation region 95 (FIG. 3) (and consequently the aerodynamic performance of the airfoil 110) can be extended by moving the synthetic jet actuator 10 farther downstream relative to the obstruction 130. For example, in a second preferred embodiment, an obstruction 130 having a characteristic height (h/c=0.01) is placed at x/c=0.22. In such a second preferred embodiment, the streamwise position of the synthetic jet actuator 10 relative to the obstruction 130 may be increased from x'/h=0 (of the first preferred embodiment) to 6. Note that x' is the streamwise distance measured from the obstruction 130.

Figure 8:
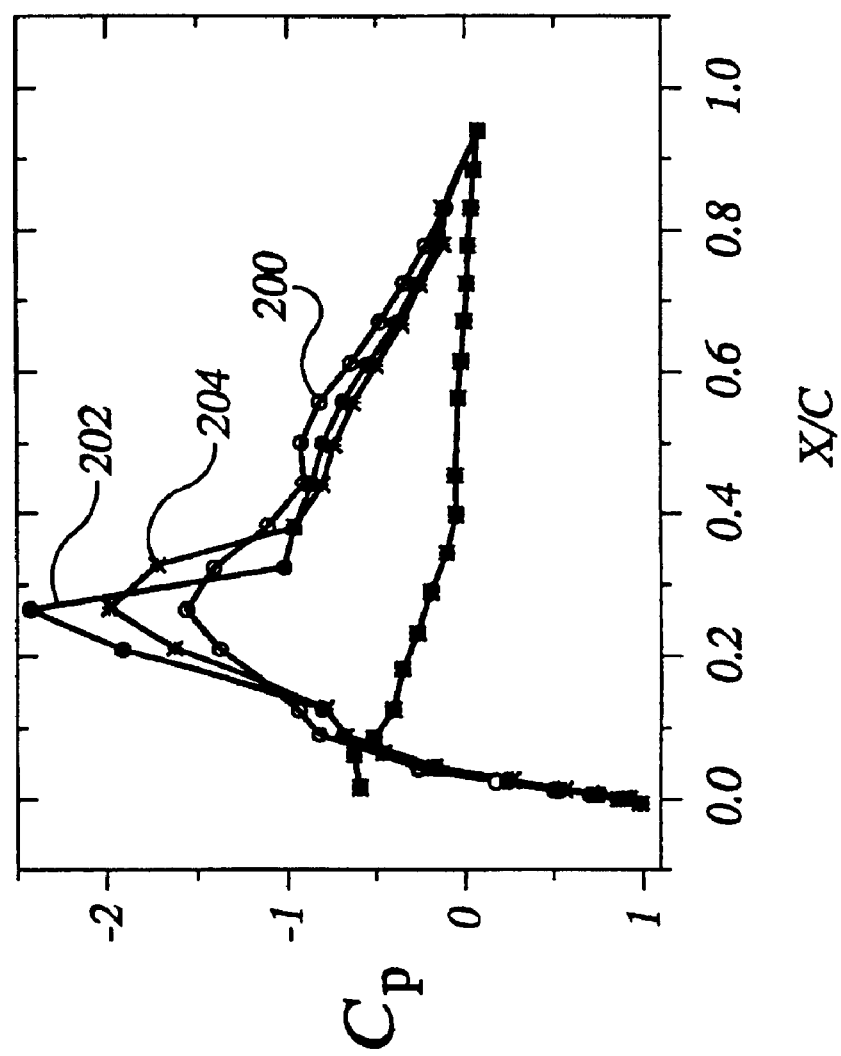
FIG. 8 is a plot of pressure coefficient distribution for varying locations of a synthetic jet actuator relative to a surface mounted passive obstruction, for the airfoil of FIG. 3.

The resulting distributions of the pressure coefficient ($C_p$) for this second preferred embodiment are shown in FIG. 8. In FIG. 8, the distribution for the baseline configuration 200 in the absence of actuation is also shown for reference. The most prominent feature of these distributions is the increase in the magnitude of the low (suction) pressure within the interaction domain of the actuation with the cross flow. The upstream jet (x'/h=0), line 202, results in a large suction peak at x/c=0.25(−2.43 compared to −1.55 for the baseline configuration 200) followed by a rapid pressure recovery for 0.25<x/c<0.32, and thereafter the pressure recovery towards the trailing edge is more gradual. Compared to the upstream jet 202, activation of the jet that is located at (x'/h=6), line 204, yields a lower suction peak (around x/c=0.25) and a wider pressure distribution around it. However, the pressure recovery for x/c>0.4 is similar for both cases 202, 204. It can also be observed that the pressure in the presence of actuation 202, 204 is lower than for the baseline configuration 200, indicating a reduction in pressure drag.

Figure 9A:
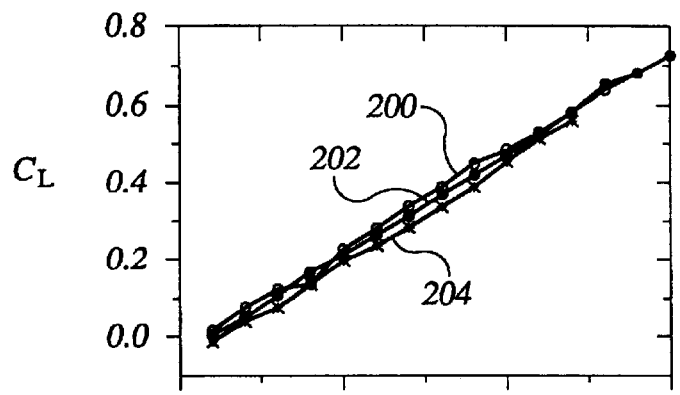
FIG. 9A is a plot of the lift coefficient for the airfoil of FIG. 3 for varying angles of attack, where the location of the synthetic jet actuator relative to the surface mounted passive obstruction is varied.
Figure 9B:
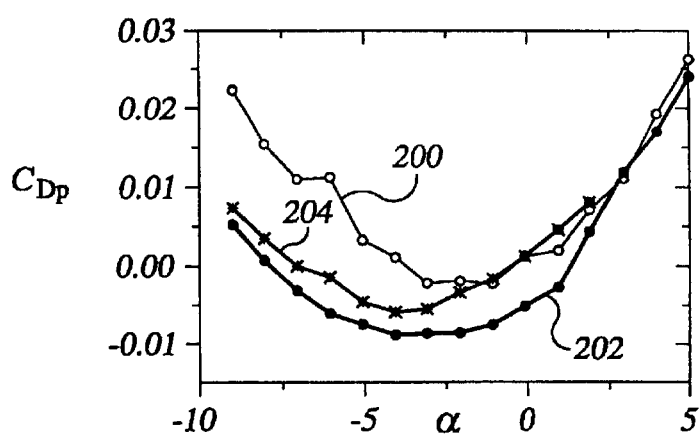
FIG. 9B is a plot of the pressure drag coefficient for the airfoil of FIG. 3 for varying angles of attack, where the location of the synthetic jet actuator relative to the surface mounted passive obstruction is varied.
Figure 9C:
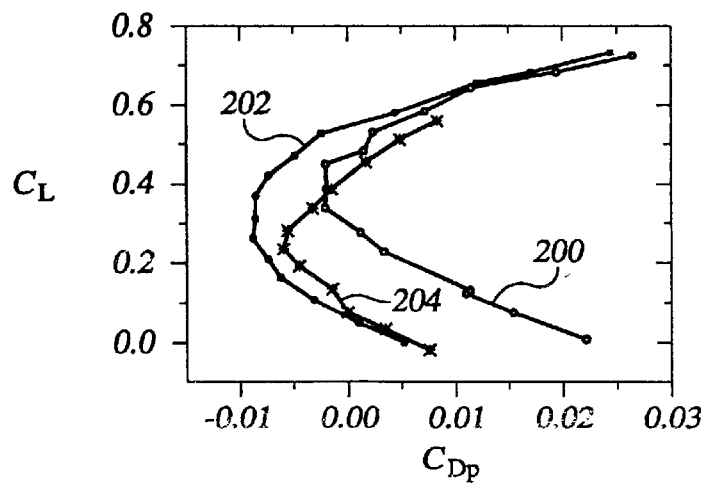
FIG. 9C is a plot of the drag polar for the airfoil of FIG. 3 for varying angles of attack, where the location of the synthetic jet actuator relative to the surface mounted passive obstruction is varied.
Figure 10A:
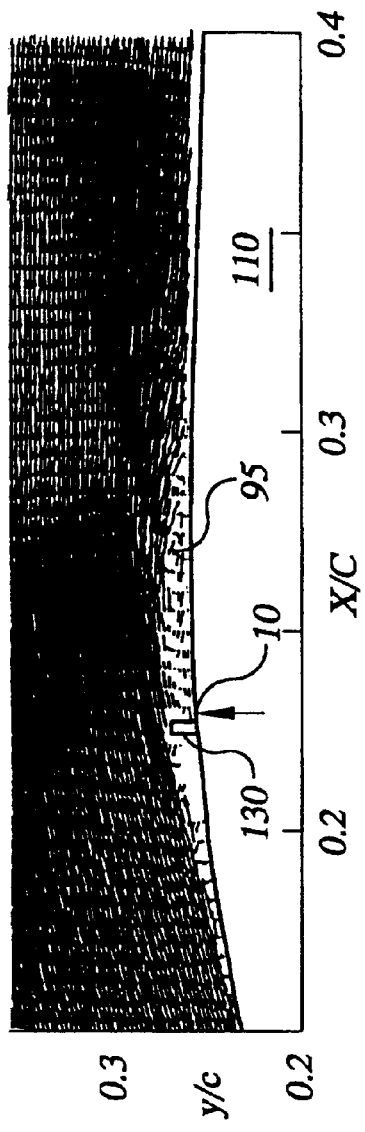
FIGS. 10A and 10B are cross-stream maps of the phase averaged velocity vector fields showing the characteristic dimensions of the recirculation bubble for varying locations of the synthetic jet actuator relative to the surface mounted passive obstruction.
Figure 10B:
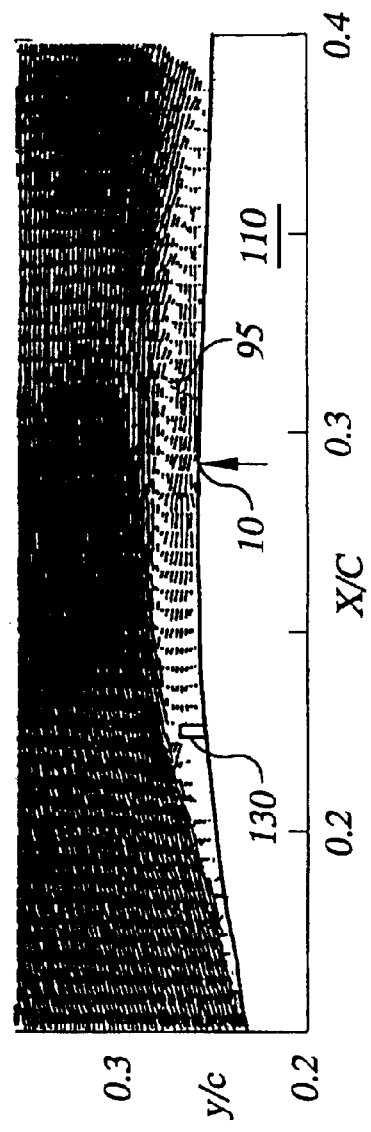

The corresponding distributions of lift coefficient ($C_L$), pressure drag ($C_{Dp}$), and the pressure drag polar for the second preferred embodiment are shown in FIGS. 9A–9C, respectively. As shown in FIG. 9A, when the control synthetic jet actuator 10 (FIG. 10A) is adjacent the obstruction (x'/h=0), line 202, the pressure drag coefficient is reduced throughout the entire measurement range (FIG. 9A) while the lift is almost unchanged compared to the baseline configuration 200. In fact, the pressure drag polar (FIG. 9C) shows that for a given magnitude of the lift coefficient, the pressure drag coefficient is reduced (the major effect is for $\alpha<1°$). The performance of the actuation (in terms of reduction in pressure drag with a minimum penalty in lift) is somewhat degraded when the jet is placed farther downstream (x'/h=6), line 204, and seems to be related to the characteristic dimensions of the recirculation region (FIGS. 10A and 10B). It is noted that the downstream jet, line 204, cannot maintain an attached flow (in the presence of the obstruction 130) at angles of attack above 3°.

From FIG. 8 it can be surmised that placement of the actuation jet farther downstream along the surface of the airfoil (line 204) extends the streamwise length of the recirculating region, and hence, diminishes the magnitude of the suction peak as the external flow turns around the recirculation region. This effect can also be depicted in time-averaged vector maps that could be obtained, for example, from PIV images in the streamwise domain 0.15<x/c<0.4 (FIGS. 10A and 10B). These figures show that the maximum height of the recirculation region 95 increases from approximately 1.07 (h) to 1.71 (h), and its length increases from approximately 6.5(h) for x'/h=0, to 12.9 (h) for x'/h=6. These images confirm that the pressure distribution in the vicinity of the recirculation region 95 can be adjusted (and controlled) by extending its streamwise length and the rate of turn of the outer flow.

As discussed above, the length of the recirculation region may need to be altered on a given airfoil, on a given aircraft, for differing flight conditions. One with ordinary skill in the art can determine when the presence of an extended recirculation bubble would be preferred. To achieve this effect for a single embodiment, a second preferred embodiment may be employed with an array of synthetic jet actuators positioned at various streamwise locations along the surface of the airfoil. As noted above, this second preferred embodiment is represented in concept by the various arrows in the interior of the airfoil 110 of FIG. 3 (the first preferred embodiment). A controller, such as a microcomputer with an appropriate algorithm can change the synthetic jet actuator that is active based on the flight conditions of the aircraft. One with ordinary skill in the art could design such a control system with routine experimentation.

Figure 11A:
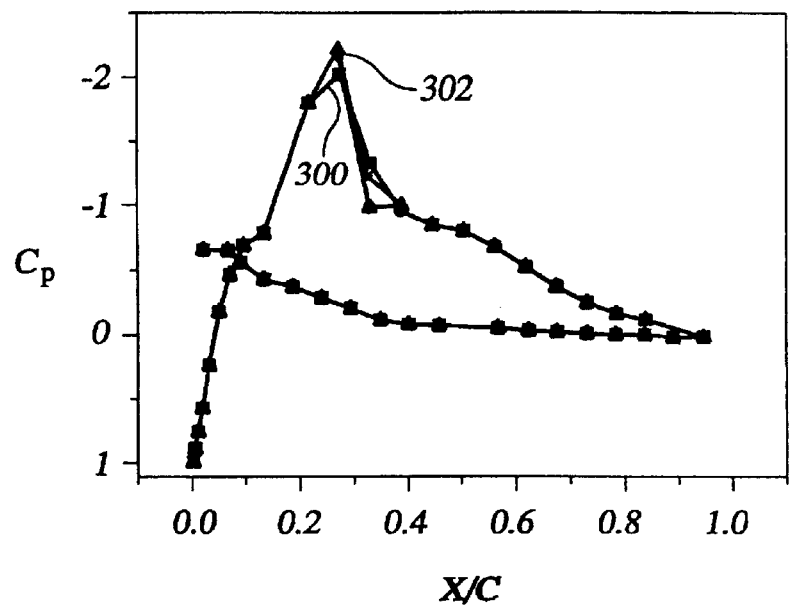
FIGS. 11A and 11B are plots of pressure drag coefficient distribution over a range of momentum coefficients.
Figure 11B:
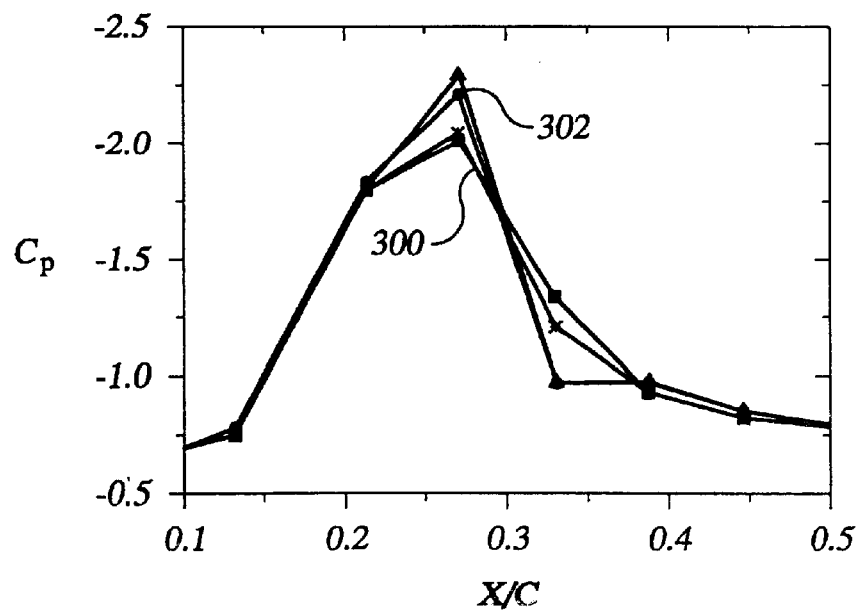

In the example data discussed above, the momentum coefficient of the jet was invariant ($C\mu=1.9\times10^{-3}$). As shown in FIGS. 1A and 1B, the sensitivity of the actuation effectiveness (as measured by the aerodynamic forces) to $C\mu$ is measured over the range $1.8\times10^{-5} \leq C\mu \leq 1.9\times10^{-3}$ for $\alpha=1°$ and the synthetic jet actuator located at $x_j/c=0.22$. The resulting pressure distributions around the airfoil are very similar (FIG. 11A) and the differences in the vicinity of the actuation domain (FIG. 11B) are rather small. For example, an increase in $C\mu$ from $3.1\times10^{-5}$, line 300, to $1.9\times10^{-3}$, line 302, results in an increase of the suction peak by approximately 10%. Therefore, it may be surmised that for this range of momentum coefficients the size of the recirculation region 95 (FIG. 3) is almost invariant. These figures indicate that at least for the present range of actuation, the effect of $C\mu$ on the lift and pressure drag (not shown), and thus on the aerodynamic performance, is minimal.

Finally, in a third preferred embodiment 400 (FIG. 12), an obstruction 401 is positioned above a surface 402 of an airfoil 403. A supporting structure for the obstruction 401 is not depicted because such a support structure is not important to the present embodiment 400. The obstruction 401 may be supported by any of a number of structures, as one with ordinary skill in the art will understand. The important feature to this third preferred embodiment 400 is that the obstruction 401 is positioned some distance above the surface 402 of the airfoil 403. The distance above the airfoil surface 402 may be adjusted based on test results for a given airfoil at a given flight condition.

By being positioned above the surface 402 of the airfoil 403, a portion of a free stream fluid 404 passes between a bottom edge 406 of the obstruction 401 and the airfoil surface 402. A synthetic jet actuator 407 is positioned downstream of the obstruction 401 with an orifice 408 of the synthetic jet actuator 407 positioned in the surface 402 of the airfoil 403. As previously discussed with regard to a synthetic jet actuator positioned upstream from a surface mounted obstruction, the synthetic jet actuator 407 of the present embodiment could similarly be positioned upstream of the non-surface mounted obstruction 401. As with the other preferred embodiments discussed above, the synthetic jet actuator 407 is caused to operate and this causes modification of the aerodynamic characteristics of the airfoil 403 due to the formation of a closed recirculating region. The fact that the obstruction 401 is positioned above the airfoil surface 402 enhances the performance of this system 400 for certain airfoils in certain flight regime.

Note that in the third preferred embodiment 400, the obstruction 401 has the shape of a mildly cambered airfoil. This is not required, but may be advantageous in certain applications of the third preferred embodiment 400.

In another preferred embodiment, a synthetic jet actuator may be placed within the obstruction. This is not depicted in the figures. However, because a synthetic jet actuator does not require a pressured fluid supply, implementation of this embodiment will be relatively straightforward, as will be understood by one with ordinary skill in the art.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A system for modifying a fluid flowing over a solid body, comprising:
   (a) an obstruction disposed on the solid body and extending outwardly from the solid body into the fluid flowing over the solid body, wherein the fluid flowing over the solid body is caused to separate from a surface of the solid body;
   (b) a synthetic jet actuator positioned in the solid body such that the fluid flowing over the solid body encounters said obstruction and is separated from the surface of the solid body before encountering said synthetic jet actuator, said synthetic jet actuator having:
      a jet housing defined by walls, said jet housing having an internal chamber with a volume of fluid and an opening in said jet housing connecting said chamber to an external environment having the fluid, and
      a volume changing means for periodically changing said volume within said internal chamber so that a series of fluid vortices are generated and projected in said external environment out from said opening of said jet housing; and
   (c) a synthetic jet stream formed by said fluid vortices entraining the fluid of said external environment, said synthetic jet strewn projected outwardly from the solid body, wherein the fluid flowing over the solid body contacts said synthetic jet stream, said direction of the fluid flow being modified by said synthetic jet stream, wherein the fluid flowing over the solid body reattaches to the surface of the solid body downstream of said synthetic jet actuator.

2. The system of claim 1, wherein said synthetic jet stream emanates in a direction perpendicular to a direction of the fluid flowing over the solid body.

3. The system of claim 1, wherein the solid body has a leading edge, a trailing edge, and a defined length therebetween, and said obstruction has a height equal to between one-half percent to three percent of said defined length.

4. The system of claim 3, wherein said obstruction is disposed on the solid body aft of said leading edge a distance between ten percent and thirty percent of said defined length.

5. The system of claim 4, wherein said opening of said jet housing is located in a range between adjacent said obstruction up to ten percent of said defined length aft of said obstruction.

6. The system of claim 1, wherein the solid body has a leading edge, a trailing edge, and a defined length therebetween, said obstruction has a height equal to approximately one percent of the defined length of the solid body, said obstruction located aft of said leading edge by a distance equal to approximately nineteen percent of said defined length, and said synthetic jet actuator is located aft of said obstruction by a distance equal to approximately three percent of said defined length.

7. The system of claim 1, wherein said solid body is an aerodynamic surface.

8. The system of claim 1, wherein said solid body is a wing.

9. A system for causing fluid flow in a bounded volume, comprising:
   (a) an obstruction disposed on an aerodynamic surface, said obstruction causing a fluid flowing over said aerodynamic surface to detach from said aerodynamic surface
   (b) an air pocket on said aerodynamic surface, said air pocket disposed at a downstream position relative to said obstruction and forming said bounded volume; and
   (c) a synthetic jet actuator situated within said bounded volume, said synthetic jet actuator to emit vortices to entrain an ambient fluid to cause said fluid flow within said volume, wherein the fluid flowing over said aerodynamic surface re-attaches to said aerodynamic surface downstream of said synthetic jet actuator.

10. The system of claim 9, wherein said synthetic jet actuator comprises:
    (a) a jet housing defined by walls, said jet housing having an internal chamber with a volume of fluid and an opening in said jet housing connecting said chamber to an external environment having said fluid, and
    (b) a volume changing means for periodically changing said volume within said internal chamber so that a series of fluid vortices are generated and projected in said external environment out from said opening of said jet housing.

11. The system of claim 9, wherein said aerodynamic surface further comprises a leading edge, a trailing edge, a chord therebetween having a defined length, said obstruction has a height equal to between one half percent to three percent of said defined length, and said synthetic jet actuator is located aft of said obstruction over a range including adjacent said obstruction up a distance equal to approximately three percent of said defined length.

12. The system of claim 9, wherein said obstruction has a height equal to approximately one percent of said defined length.

13. The system of claim 9, wherein said aerodynamic surface further comprises a top surface of a wing.

14. A method for modifying a direction of a fluid stream flowing along a solid body, comprising the steps of:
    (a) providing said fluid stream flowing along said solid body;
    (b) providing a surface mounted obstruction on said solid body such that a disturbance region is created in said fluid stream, said disturbance region being aft of said obstruction;
    (c) separating said fluid stream from a surface of said solid body;

(d) generating a synthetic jet stream from said solid body that comprises a series of fluid vortices, said synthetic jet stream being generated downstream from said separation;

(e) creating a bounded air pocket on said solid body by directing said synthetic jet stream into said disturbance region;

(f) passing said fluid stream over said solid body;

(g) modifying said direction of said fluid stream by contacting said fluid stream with said air pocket; and (h) re-attaching said fluid stream to the surface of said solid body downstream from said synthetic jet stream.

15. The method of claim 14, wherein said bounded air pocket further comprises a stationary recirculating flow.

16. The method of claim 14, wherein said solid body further comprises a wing.

17. A system for modifying the aerodynamic characteristics of a solid body, comprising:

an obstruction positioned near an outer surface of the solid body such that a portion of a fluid flowing over the outer surface of the solid body is moved away from the outer surface of the solid body, said fluid flowing over the outer surface of the solid body detaching from the outer surface of the solid body;

a synthetic jet actuator positioned in the solid body such that a fluid flowing over the solid body is moved away from and detached from the outer surface of the solid body by said obstruction before encountering said synthetic jet actuator, said synthetic jet actuator generating a closed recirculation region of a fluid so that a direction of a fluid flowing over the surface of the solid body is modified by a closed recirculation region in order to re-attach the fluid flowing over the surface of the solid body to the surface of the solid body downstream from said synthetic jet actuator.

18. The system of claim 17, wherein said obstruction is disposed on the surface of the solid body such that said obstruction extends outwardly from the surface of the solid body into the fluid flowing over the solid body.

19. The system of claim 17, wherein said obstruction is disposed above the surface of the solid body such that a second portion of the fluid flowing over the surface of the solid body passes between said obstruction and the surface of the solid body.

20. The system of claim 18, wherein said obstruction comprises an aerodynamic surface with a camber.

21. The system of claim 17, wherein said synthetic jet actuator comprises a plurality of synthetic jet actuators positioned along the surface of the solid body.

22. The system of claim 17, wherein said obstruction comprises an inflatable rib, such that a size of said obstruction may be modified.

23. The system of claim 17, wherein said obstruction comprises a hinged flap operatively coupled to an inflatable member, said hinged flap covering said synthetic jet actuator when not in use.

24. The system of claim 18, wherein said obstruction is partially vented to allow a bleed flow therethrough.

25. A system for modifying the aerodynamic characteristics of a solid body, comprising:

an obstruction positioned near an outer surface of the solid body;

a synthetic jet actuator, said synthetic jet actuator generating a closed recirculation region of a fluid so that a direction of a fluid flowing over the surface of the solid body is modified by a closed recirculation region;

wherein the fluid flowing over the solid body is separated from the outer surface of the solid body upstream from said synthetic jet actuator and re-attached to the outer surface of the solid body downstream from said synthetic jet actuator.

26. The system of claim 25, wherein said synthetic jet actuator is disposed in said obstruction.

27. The system of claim 26, wherein said obstruction is disposed on the surface of the solid body such that said obstruction extends outwardly from the surface of the solid body into the fluid flowing over the solid body.

28. The system of claim 26, wherein said obstruction is disposed above the surface of the solid body such that a second portion of the fluid flowing over the surface of the solid body passes between said obstruction and the surface of the solid body.

29. A system for modifying a fluid flowing over a solid body, comprising:

(a) an obstruction disposed on the solid body, the solid body having a leading edge, a trailing edge, and a defined length therebetween said obstruction extending Outwardly from the solid body into the fluid flowing over the solid body, said obstruction being a height equal to between one-half percent to three percent of said defined length;

(b) a synthetic jet actuator positioned in the solid body such that the fluid flowing over the solid body encounters said obstruction before said synthetic jet actuator, said synthetic jet actuator having:

a jet housing defined by walls, said jet housing having an internal chamber with a volume of fluid and an opening in said jet housing connecting said chamber to an external environment having the fluid, and a volume changing means for periodically changing said volume within said internal chamber so that a series of fluid vortices are generated and projected in said external environment out from said opening of said jet housing; and (c) a synthetic jet stream formed by said fluid vortices entraining the fluid of said external environment, said synthetic jet stream projected outwardly from the solid body, wherein the fluid flowing over the solid body contacts said synthetic jet stream, said direction of the fluid flow being modified by said synthetic jet stream.

30. The system of claim 29, wherein said obstruction has a height equal to approximately one percent of the defined length of the solid body, said obstruction located aft of said leading edge by a distance equal to approximately nineteen percent of said defined length, and said synthetic jet actuator is located aft of said obstruction by a distance equal to approximately three percent of said defined length.

31. A system for causing fluid flow in a bounded volume, comprising:

(a) an obstruction disposed on an aerodynamic surface, said aerodynamic surface including a leading edge, a trailing edge, a chord therebetween having a defined length, said obstruction having a height equal to between one half percent to three percent of said defined length;

(b) an air pocket on said aerodynamic surface, said air pocket disposed at a downstream position relative to said obstruction and forming said bounded volume; and (c) a synthetic jet actuator situated within said bounded volume, said synthetic jet actuator to emit vortices to entrain an ambient fluid to cause said fluid flow within said volume; and wherein said synthetic jet actuator is located aft of said obstruction at a location within a range from adjacent to said obstruction up to a distance equal to approximately three percent of said defined length.

32. The system of claim 31, wherein said obstruction has a height equal to approximately one percent of said defined length.

33. A system for modifying the aerodynamic characteristics of a solid body, comprising:

an obstruction positioned near an outer surface of the solid body such that a portion of a fluid flowing over the outer surface of the solid body is moved away from the outer surface of the solid body and said obstruction is partially vented to allow a bleed flow therethrough;

a synthetic jet actuator positioned in the solid body such that a fluid flowing over the solid body is moved away from the outer surface of the solid body by said obstruction before encountering said synthetic jet actuator, said synthetic jet actuator generating a closed recirculation region of a fluid so that a direction of a fluid flowing over the surface of the solid body is modified by a closed recirculation region.

34. A system for modifying the aerodynamic characteristics of a solid body, comprising:

an obstruction positioned near an outer surface of the solid body and extending outwardly from the surface of the solid body into a fluid flowing over the solid body;

a synthetic jet actuator, said synthetic jet actuator generating a closed recirculation region of a fluid so that a direction of a fluid flowing over the surface of the solid body is modified by the closed recirculation region;

wherein the fluid flowing over the solid body is separated from the outer surface of the solid body upstream from said synthetic jet actuator and re-attached to the outer surface of the solid body downstream from said synthetic jet actuator.

35. The system of claim 34, wherein said solid body is an aerodynamic surface.

36. The system of claim 34, wherein said solid body is a wing.

* * * * *